United States Patent [19]

Baker et al.

[11] Patent Number: 5,117,087

[45] Date of Patent: May 26, 1992

[54] METHOD OF PRODUCING AN APERTURED COMPONENT

[75] Inventors: George E. Baker, Leire; Edward C. Williams, Mickleover, both of England

[73] Assignee: Elliott Industries Limited, London, England

[21] Appl. No.: 567,074

[22] Filed: Aug. 14, 1990

[30] Foreign Application Priority Data

Aug. 15, 1989 [GB] United Kingdom ................. 8918606

[51] Int. Cl.$^5$ .............................................. B23K 26/00
[52] U.S. Cl. .............................. 219/121.71; 219/121.7; 219/121.84
[58] Field of Search ............ 219/121.7, 121.71, 121.84

[56] References Cited

U.S. PATENT DOCUMENTS 4,218,606 8/1980 Whitman, III ................ 219/121.7 X
4,257,559 10/1981 Whitman, III ................ 219/121.7 X Primary Examiner—C. L. Albritton
Attorney, Agent, or Firm—Longacre & White

[57] ABSTRACT

A plurality of apertures are formed in a component e.g. by a laser drilling method, the finished component being intended to have a fluid flow through the apertures which is as close as possible to a predetermined value. After one aperture or a series of apertures has been formed, the fluid flow therethrough is measured and is compared with the predetermined value. The process parameters are then adjusted in the formation of the next aperature or series of apertures in acordance with the comparison.

6 Claims, 2 Drawing Sheets

METHOD OF PRODUCING AN APERTURED COMPONENT

The present invention relates to a method of producing an apertured component having in use a fluid flow therethrough which is as close as possible to a predetermined value. The invention is applicable in particular to the production of components for a gas turbine, such as turbine blades or combustor cooling rings.

In producing components of the above-mentioned type, it is desirable that the fluid flow through the apertures is as close as possible to a predetermined desired value. Conventionally, the apertures are formed (such as by laser drilling) using specific process parameters and, after all of the apertures have been so produced, the overall fluid flow through the component is measured to check that it comes reasonably close to the desired value. Using this technique, it is possible to achieve a typical tolerance of ±10%.

It is an object of the present invention to provide a method of the kind specified wherein much closer tolerances are possible.

According to a first aspect of the present invention, such a method comprises the steps of:

forming in said component a said first aperture or a first series of apertures, subsequently forming in said component at least one further aperture or at least one further series of apertures, prior to the formation of each said further aperture or series of apertures, measuring the fluid flow through substantially all of the previously-formed apertures, comparing the measured fluid flow with said predetermined value, and adjusting the size of said further aperture or further series of apertures in accordance with said comparison.

According to a second aspect of the present invention, such a method comprises forming in said component a first series of apertures, measuring the fluid flow through said first series of apertures, comparing the measured fluid flow with predetermined value, and forming in said component a second series of apertures whose size is adjusted in accordance with said comparison.

Preferably, the finished component has a plurality of apertures in each of a plurality of sections, and the apertures in each section are formed so as to have a predetermined fluid flow therethrough.

Conveniently, the apertures in one given section are all formed before the apertures in another given section. Alternatively, a proportion of the apertures in all of the sections are formed first, the fluid flow through those apertures in each section is measured, and the remaining apertures in all of the sections are formed subsequently. In a further alternative, apertures are formed firstly in a test component, the fluid flow through the apertures is measured, the process is repeated until a fluid flow close to said predetermined value is obtained, and the apertures are then formed in the component proper using the same process parameters as for the test component.

Desirably, the fluid flow is measured as a pressure differential across the apertures produced by a constant mass flow of fluid. The constant mass flow of fluid is advantageously produced using a critical flow nozzle and a pressure regulator upstream thereof.

The present invention will now be further described, by way of example only, with reference to the accompanying drawings, in which.

Figure 1:
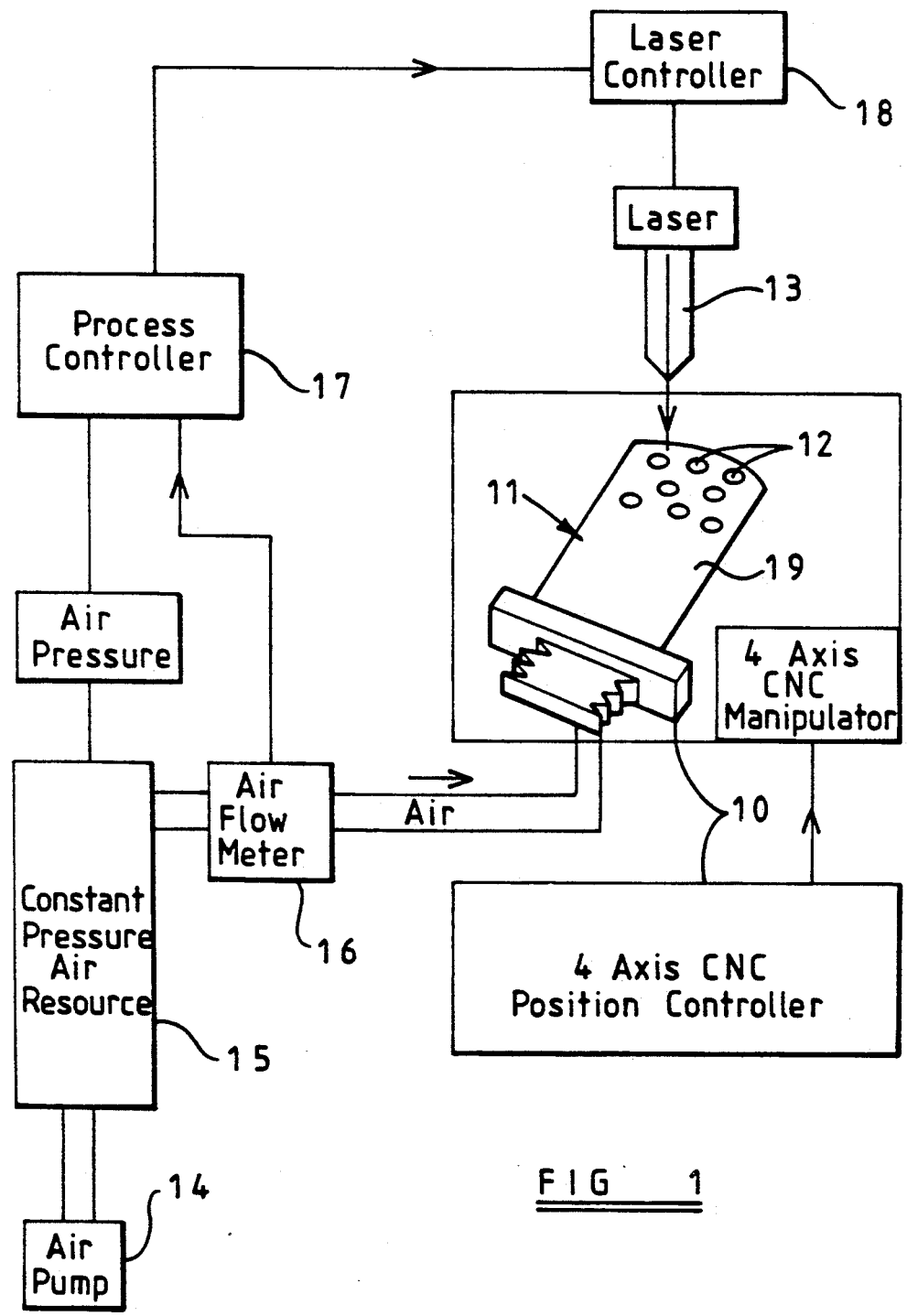
FIG. 1 is a schematic diagram of apparatus for performing the method of the invention, as applied to a gas turbine blade.

Referring first to FIG. 1, the illustrated apparatus comprises generally a numerically-controlled manipulator 10 on which is mounted a component 11 in which apertures 12 are to be formed, and a laser drill 13 for producing the apertures 12. Air is supplied to the component 11 by way of a pump 14 and a constant pressure air reservoir 15, and the flow of air through the apertures 12 is measured by a flow meter 16. The meter 16 in turn supplies signals to a process controller 17 which is also responsive to the source air pressure, and a laser controller 18 controls operation of the laser drill 13 under command from the process controller 17.

In use, the laser drill 13 forms a first aperture in the component 12 at preset parameters of laser pulse power, pulse duration and focal length. The air flow through that aperture is then measured by the meter 16 and is compared by the process controller 17 with a predetermined desired value of air flow. The process parameters of the laser drill 13 are then adjusted so that, when the drill subsequently produces a second aperture in the component, the dimensions of this aperture are increased or decreased towards a value to give the desired overall air flow. The combined air flow through both apertures is then measured, and the laser drill parameters are again suitably adjusted for the production of a third aperture. This process is repeated until the desired number of apertures have been produced: prior to each laser drilling operation, the combined air flow through all of the previously-formed apertures is measured, and the process parameters of the laser drill 13 are adjusted so that each new aperture is sized to bring the overall air flow closer to the predetermined desired value.

Figure 2:
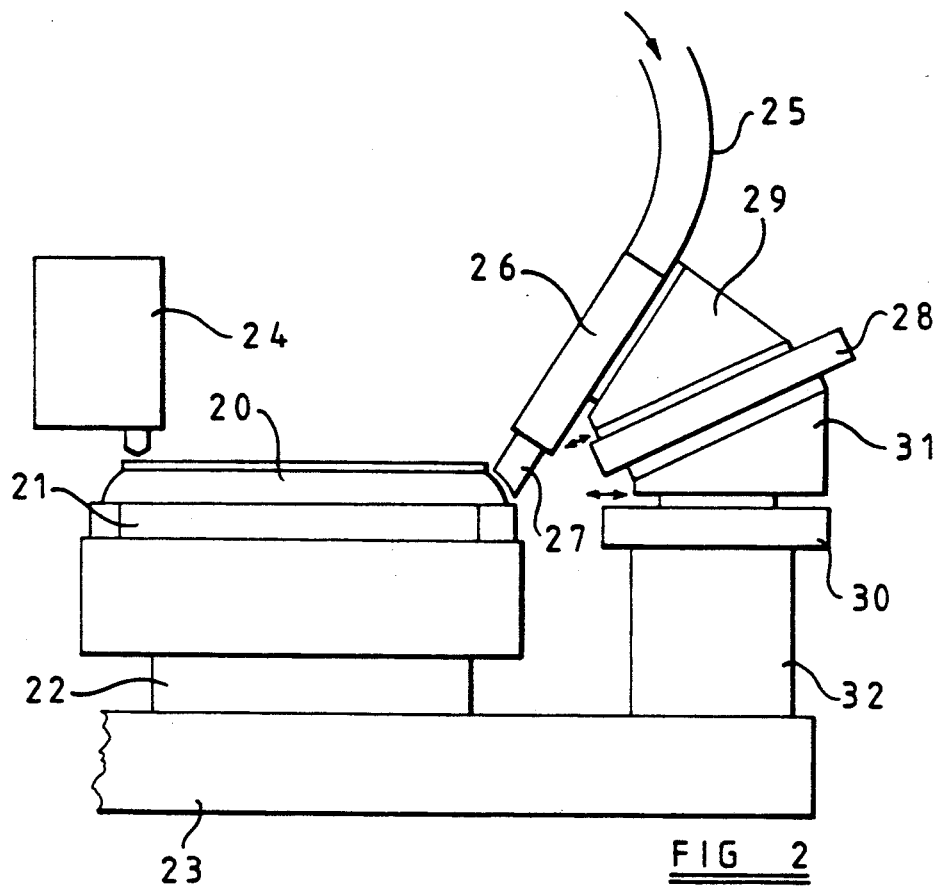
FIG. 2 is a side view of apparatus for performing the method of the invention, as applied to a combustor cooling ring.
Figure 3:
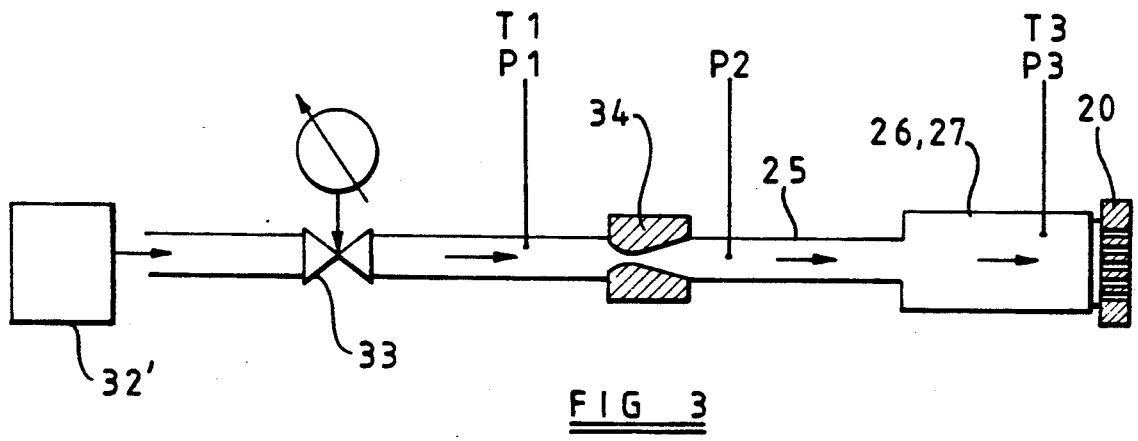
FIG. 3 is a diagram of part of the apparatus shown in FIG. 2.

The apparatus of FIG. 1 illustrates the formation of apertures in a turbine blade 19. However, the technique can be applied to many other types of component, and FIGS. 2 and 3 show the invention as applied to a combustor cooling ring 20 of a gas turbine engine. The cooling ring 20 is mounted on a fixture 21 on a rotary table 22, which is in turn supported by a carriage 23 for rectilinear movement in the Y-axis direction. A laser drilling head 24 is positioned adjacent to the ring 20 on a mounting which permits movement in the X- and Z-axis directions. Also positioned adjacent to the ring 20 is an operative end of a flow measuring device (to be described in detail later), comprising a flow pipe 25, a flow straightener 26 and a flow adaptor 27 in the form of a flexible rubber boot. The device is carried on an approach slide 28 through the intermediary of an approach spacer 29 while the slide 28 is in turn carried by a clearance slide 30 by way of a further approach spacer 31. The whole assembly is mounted on a plinth 32 which upstands from the Y-axis carriage 23.

The flow measuring device is shown in detail in FIG. 3, and comprises a supply 32' of clean dry air which passes via a pressure regulator 33 to the upstream side of a critical flow nozzle 34, the down stream side of the nozzle being connected to the aforementioned flow pipe 25, flow straightener 26 and flow adaptor 27. So long as the pressure P1 of the air upstream of the nozzle 34 is maintained at at least double the pressure P2 on the downstream side thereof, the flow rate through the nozzle 34 for a given temperature T1 will be directly proportional to the pressure P1, irrespective of the value of the pressure P2 of the air downstream of the nozzle. Thus, a constant mass flow of air can be applied to the combustor ring 20 by regulating the pressure P1 using the regulator 33, and the pressure differential P3 across the apertures is then measured.

The combustor cooling ring 20 typically needs to have two parallel, circumferentially-extending rows of apertures formed therein, there being about 1000 equally spaced apertures in each row. Typically also, it is desired that each sector of the ring composed of, say, 40 apertures has a closely defined air flow therethrough, and that the overall ring also has a total air flow which is close to a predetermined value. To produce each sector, the laser drill 24 is first used to form, say, 30 of the 40 apertures. The sector is then positioned adjacent to the flow measuring device, and the latter is manipulated using the slides 28 and 30 to clamp the adaptor 27 against the exterior of the ring 20 and embracing the thirty apertures which have already been formed. The combined air flow through those apertures is then measured, and is compared with the desired, predetermined value for the sector. Suitable adjustments are then made to the process parameters of the laser drill 24, and the sector is returned to the drilling head so that the remaining ten apertures can be formed to those parameters.

In actual practice, a master apertured component is first set up on the apparatus and the flow characteristics for a given pressure differential are measured. The component proper to be machined is then set up on the apparatus. After the first series machined is then set up on the apparatus. After the first series of apertures have been formed in the component proper, the process parameters of the laser drill are altered to give a change in diameter of the aperture as follows:

$$\Delta D = \frac{-D}{4} \frac{(\Delta P3g)}{(CSF \cdot P1^2)} \frac{(T1)}{(T3)}$$

where D is the aperture diameter

P1 is the absolute input pressure to the critical flow nozzle

P3g is the gauge input pressure to the component being tested $\Delta P3g$ is the pressure error relative to the master T1 is the absolute temperature of the air at the input to the critical flow nozzle T3 is the absolute temperature of the air at the input to the component being tested, and CSF is a calibration scale factor obtained from the initial measurement on the master, calculated in accordance with the following formula:

$$CSF = \frac{P3g(CAL)}{P1^2(CAL)} \frac{(T1)}{(T3)}$$

where P3g(CAL) is the value of P3g as measured on the master, and (CAL) is the absolute input pressure to the critical flow nozzle during mastering.

In one particular example, each sector of apertures is formed at one time and before the next sector is commenced. Alternatively, thirty out of forty apertures in all of the sectors can be formed initially, the resultant air flow measurements made, with the remaining apertures being produced afterwards. This decreases the downtime of the apparatus. The apertures can be produced in the combustor ring 20 in the first instance. Alternatively, a test plate having the same cross-section as the ring can be drilled first and the air flow therethrough measured. The dimensions of the apertures can then be "fine tuned" before machining of the ring proper commences.

Once one combustor ring has been fully machined, the same process parameters can be utilised for machining other combustor rings.

The laser drill 24 can form the apertures by trepanning or by percussion drilling, i.e. with a small thickness of material being removed with each laser pulse until breakthrough is achieved. In the latter case, each aperture can be completely formed before the laser drill moves on to produce the next aperture: however, this does mean that the combustor ring 20 is continually stopped and started in its rotary movement. As an alternative, the apertures can be produced "on the fly", that is to say the drilling head 24 can be keyed to specific aperture locations around the circumference of the ring 20, and the ring can be rotated while the drill removes successive thicknesses of material at each aperture location on successive passes. In this way, each aperture receives a single laser pulse on each pass, and the apertures are all formed progressively over a number of rotations of the ring, thus enabling the ring to be rotated continuously at least until the first thirty apertures in each section have been formed.

It has been found that, using the above-described technique, an apertured component can be produced wherein the actual air flow through the apertures is within a much closer tolerance than has bee possible previously. This gives rise to an increased efficiency in the gas turbine system, and can cause great economic benefit to the end user particularly in the case of gas turbines of relatively large power ratings. Compensation for air pressure and air temperature is provided for, and also for any non-linearity in the air flow for apertures in different parts of the component. The flow measurements can, if desired, be taken continuously and readings made in a cycle so the system responds very quickly to any variations needed in the laser drill process parameters.

Although the above description refers specifically to components such as blades and combustion cooler rings for gas turbines, it will be appreciated that the invention has much more general applicability than this. Also, the invention can be applied not just to laser drilling but to any other process for producing apertures in a component, such as spark erosion machining.

Furthermore, the invention can be applied to components where a fluid other than air is intended to flow through the apertures.

I claim:

1. A method of producing a component having a plurality of apertures with a given overall fluid flow therethrough, said method comprising the steps of:
   a) dividing the component into a plurality of sections, each section having a set number of apertures therein,
   b) forming a proportion of the set number of apertures in each section,
   c) measuring the amount of fluid flow through the formed set number of apertures in each section, d) comparing the measured fluid flow with a predetermined fluid flow value, and
e) forming the remaining apertures in all the sections, the remaining apertures having a dimension which is adjusted in accordance with the comparison of the measured fluid flow of step (d) and the predetermined fluid flow value to provide the given overall flow.

2. A method as claimed in claim 1, wherein the apertures are formed using a laster machining process.

3. A method as claimed in claim 1 wherein after forming said proportion of the set number of apertures in each section, the process portions of the laser are altered to give a change in aperture diameter according to the following formula:

$$\Delta \frac{-D}{4} \frac{(P3g)}{(CSF \cdot P1^2)} \frac{(T1)}{(T3)}$$

where D is the aperture diameter
P1 is the absolute input pressure to the critical flow nozzle
P3g is the gauge input pressure to the component being tested
$\Delta$P3g is the pressure error relative to the master
T1 is the absolute temperature of the air at the input to the critical flow nozzle
T3 is the absolute temperature of the air at the input to the component being tested, and
CSF is a calibration scale factor obtained from the initial measurement on the master, calculated in accordance with the following formula:

$$CSF = \frac{P3g(CAL)}{P1^2(CAL)} \frac{(T1)}{(T3)}$$

4. A method as claimed in claim 1, wherein the fluid flow is measured as a pressure differential across the apertures produced by a constant mass flow of fluid.

5. A method as claimed in claim 4, wherein the constant mass flow of fluid is produced using a critical flow nozzle and a pressure regulator upstream thereof.

6. A method as claimed in claim 2 wherein after forming said proportion of the set number of apertures in each section, the process portions of the laster are altered to give a change in aperture diameter according to the following formula:

$$\Delta D - \frac{-D}{4} \frac{(P3g)}{(CSF \cdot P1^2)} \frac{(T1)}{(T3)}$$

where D is the aperture diameter
P1 is the absolute input pressure to the critical flow nozzle
P3g is the gauge input pressure to the component being tested
$\Delta$P3g is the pressure error relative to the master
T1 is the absolute temperature of the air at the input to the critical flow nozzle
T3 is the absolute temperature of the air at the input to the component being tested and
CSF is a calibration scale factor obtained from the initial measurement on the master, calculated in accordance with the following formula:

$$DSF = \frac{P3g(CAL)}{P1^2(CAL)} \frac{(T1)}{(T3)}$$

where P3g(CAL) is the value of P3g as measured on the master, and p1(CAL) is the absolute input pressure to the critical flow nozzle during mastering.

* * * * *